Nov. 9, 1926.
A. A. LANDON
1,606,433
CONDENSER
Filed Dec. 6, 1923    2 Sheets-Sheet 1
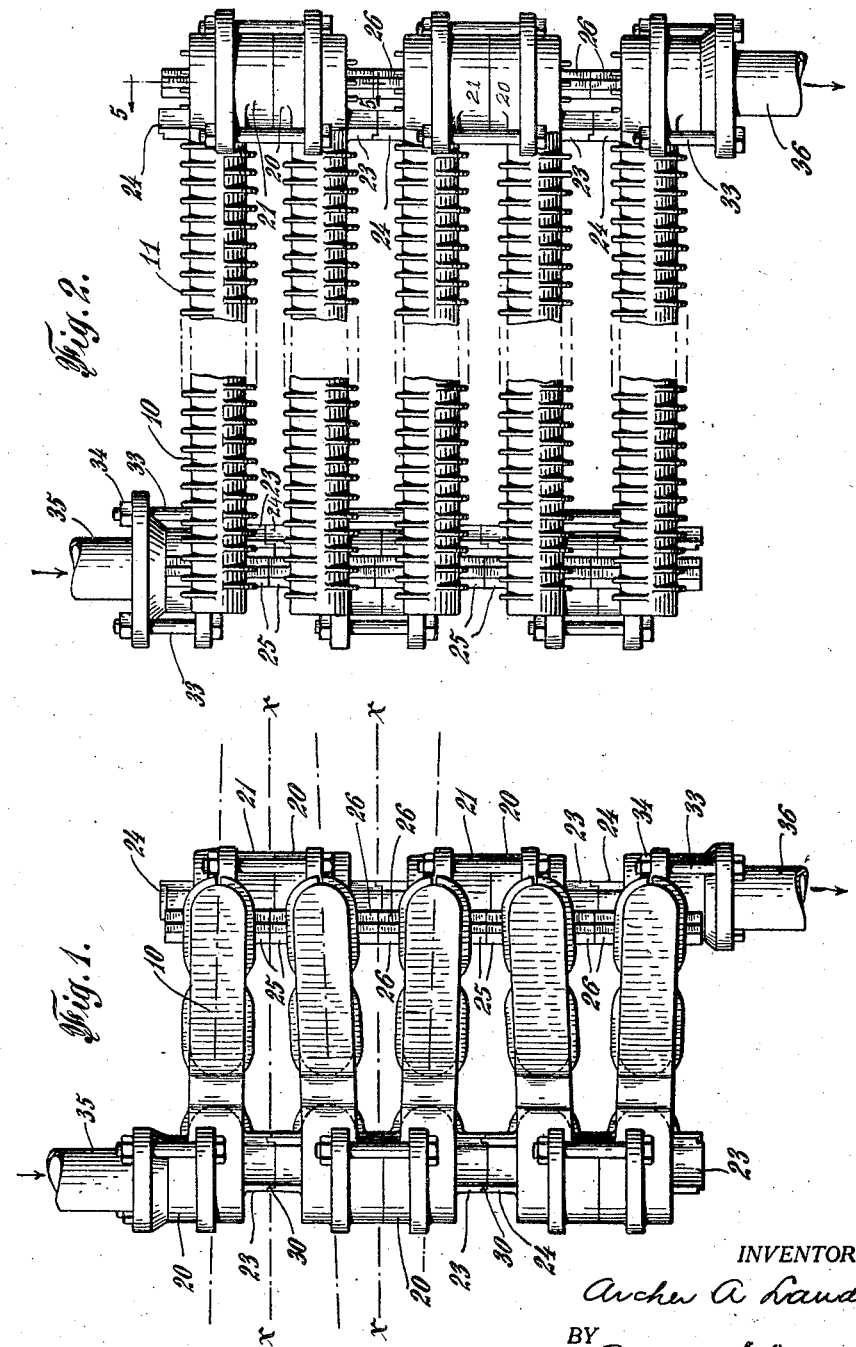
INVENTOR
Archer A. Landon
BY
Conrad A. Dietrich
his ATTORNEY

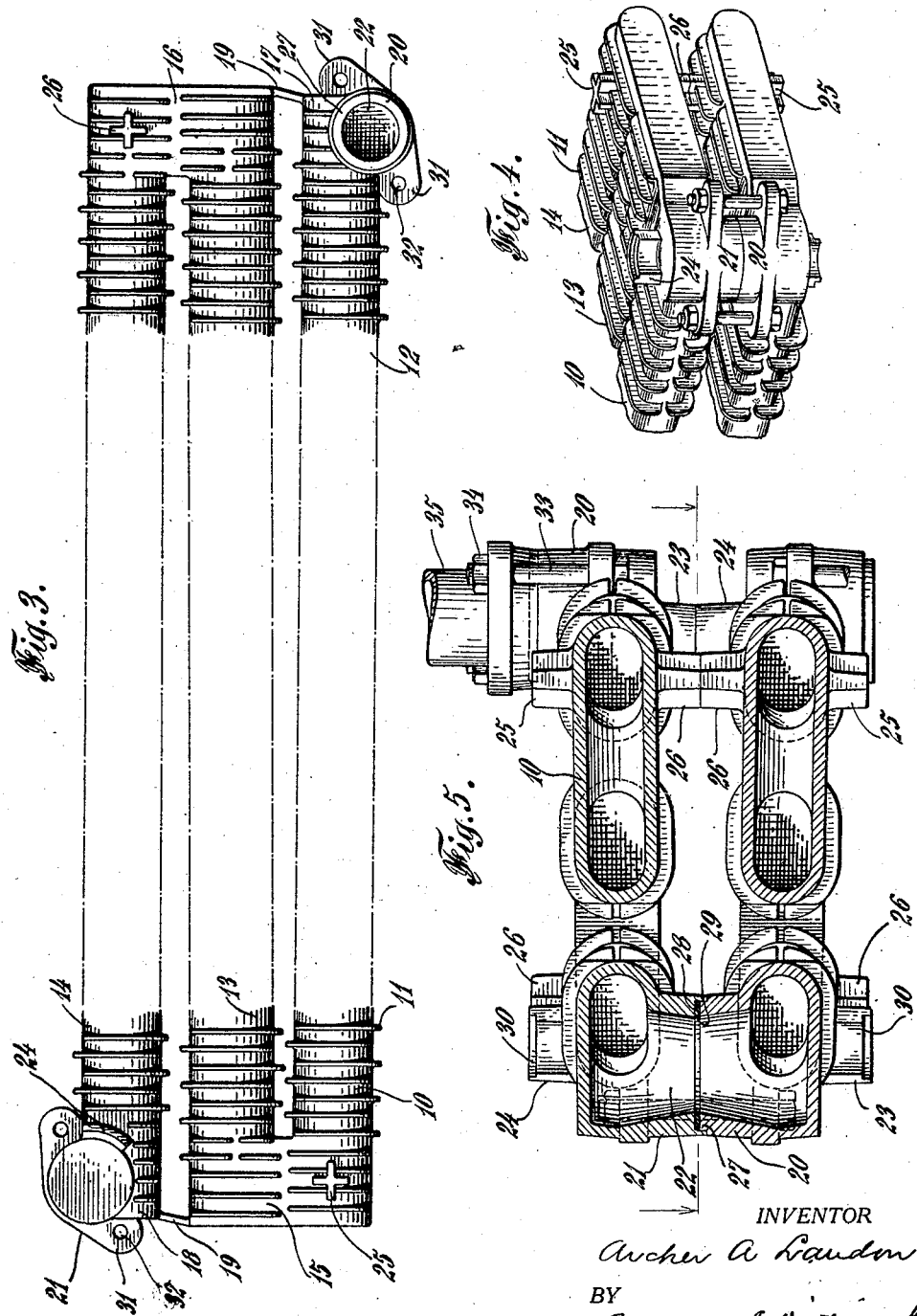

Patented Nov. 9, 1926.

1,606,433

UNITED STATES PATENT OFFICE.

ARCHER A. LANDON, OF BUFFALO, NEW YORK, ASSIGNOR TO AMERICAN RADIATOR COMPANY, OF NEW YORK, N. Y., A CORPORATION OF NEW JERSEY.

CONDENSER.

Application filed December 6, 1923. Serial No. 678,865.

My invention relates to improvements in condensers and the same has for its object more particularly to provide a simple, compact, efficient and reliable apparatus which can be readily cleaned and repaired and which is especially adapted for condensing oils, such as petroleum, distillates, tars, creosotes and the like.

Further, said invention has for its object to provide a condenser in which the vapors can be thoroughly condensed and cooled.

Further, said invention has for its object to provide a sectional condenser in which any section thereof may be readily and conveniently removed and replaced.

Further, said invention has for its object to provide a sectional condenser in which the several sections thereof are sufficiently spaced to permit the cleaning of the same with a high pressure hose or a tool to remove mud and scale therefrom.

Further, said invention has for its object to provide a condenser in which the distillate flow is continuous and unimpeded, and in which clogging and back pressure is prevented.

Further, said invention has for its object to provide a sectional condenser in which the several sections thereof are rigidly and securely fastened together by exteriorly arranged devices which are readily accessible, conveniently arranged, and few in number to permit the ready disconnection of the sections and their replacement.

Further, said invention has for its object to provide a sectional condenser in which the several sections thereof are so mounted as to be inclined alternately in opposite directions to permit a continuous and unimpeded flow therethrough and perfect drainage therefrom, and in which the sections are maintained in such inclined and also spaced relation by exteriorly located fastening devices or bolts accessible to permit the quick and ready removal or replacement of a section, and which fastening devices are so arranged as to firmly and rigidly hold said sections in such inclined and spaced position and to provide a tight joint in the means of communication between the sections.

Further, said invention has for its object to provide a sectional condenser in which the several sections thereof are arranged in superimposed and in spaced relation and in which the spacing members thereof interfit to prevent lateral movement of the sections, and to maintain the same in firm and solid engagement to provide tight joints between the sections and to maintain the same securely in assembled position.

Other objects will in part be obvious and in part be pointed out hereinafter.

To the attainment of the aforesaid objects and ends my invention consists in the novel details of construction and in the combination, connection and arrangement of parts hereinafter more fully described and then pointed out in the claims.

In the accompanying drawings showing an illustrative embodiment of the invention, Figure 1 is an end elevation with parts broken away showing one form of condenser constructed according to and embodying my said invention;

Fig. 2 is a side elevation thereof with parts broken away;

Fig. 3 is a plan view of one of the condenser sections;

Fig. 4 is a detail perspective view of the connection between successive sections; and Fig. 5 is a sectional view of the connection shown in Fig. 4.

In said drawings, the assembled condenser consists of a plurality of superimposed sections 10 of cast iron of sufficient thickness to resist the corrosive action of the cooling agent upon the outside thereof and of the vapors and fluids being condensed therein. Each section 10 is oval shaped in cross section and is provided with heat radiating fins or ribs 11.

Each section 10 (Fig. 3) comprises a plurality of parallel parts 12, 13 and 14 (preferably of an odd number) connected together communicatively by the portions 15 and 16 and having the ends 17 and 18 thereof at diagonally opposite portions thereof. These ends 17 and 18 are braced by the members 19 connecting the same integrally with the intermediate part 13. The bracing thus provided is simple and inexpensive.

Projecting from the opposite faces of each section at the ends 17 and 18 are annular members or hubs 20 and 21, (constituting male and female members) and having openings 22 therein, whereby communication may be established between successive sections when the same are assembled. By this arrangement of the openings 22 the vapor to be condensed enters each section at the top at one end and passes successively through the parts 12, 13 and 14 and out through the other opening 22.

Curved members or lugs 23 and 24 project from the opposite faces of each section, the lug 23 being coaxial with member 20, but upon the opposite face of the section, and the lug 24 being coaxial with member 21 but upon the face of the section opposite thereto.

Lugs or members 25 and 26 (illustrated as cross shaped) project from each face of the section at the remaining diagonally opposite portions of the section.

The cross shaped lugs 25, and members 20 and 21 are shorter than the cross shaped lugs 26 and the curved lugs 23 and 24.

The several sections are assembled in superimposed relation with the adjacent members 20, 21 on adjacent faces of adjacent sections in engagement, the outer reduced portion 27 of each male member 20 interfitting with the recessed portion 28 of female member 21. A gasket 29 is interposed between said members 20, 21. The gasket 29 should preferably be of a substance such as asbestos composition capable of withstanding high temperature oil. In like manner, the adjacent curved lugs 23 and 24 upon adjacent faces of adjacent sections engage, the same being provided with interfitting portions 30 which, in cooperation with the interfitting members 20 and 21, prevent lateral movement of the sections both longitudinally and transversely and around the axis of said members 20 and 21.

With the sections 10 assembled as above described the corresponding lugs 25 and 26 also engage, providing with annular members 20 and 21 and lugs 23 and 24, a four point engagement between the successive sections.

As shown in Fig. 1, the several sections are inclined transversely alternately in opposite directions, this being permitted because the members 20, 21 and their longitudinal alined lugs 25 are shorter than the curved lugs 23 and 24 and their longitudinally alined lugs 26, the engaging members 20, 21 being arranged alternately at opposite sides of the sections. As indicated by the transverse broken lines $x$—$x$ in Fig. 1 the several engaging surfaces of the members 20 and 21, curved lugs 23 and 24, and lugs 25 and 26 lie in a plane which is inclined to the planes which pass through the centers of the sections 10 to permit of a firm and extended engagement between the same. Longitudinally the several sections are arranged horizontally, the said inclinations being transverse only.

Lugs 31 project from opposite sides of each annular member 20, 21. These lugs 31 have holes 32 therein, whereby the successive adjacent sections are connected and secured together by the bolts 33 and nuts 34, which maintain each pair of cooperating members 20, 21 in fluid tight engagement with each other and provide a firm, rigid assembly of section and a firm engagement between adjacent lugs.

A pipe 35 is connected with the upper opening 22 in the uppermost section 10 and is in communication with the usual vapor header. The lower opening 22 of the lowermost section is similarly connected by a pipe 36 in communication with the usual distillate header.

In operation the vapor to be condensed, entering the uppermost section at the high side thereof through the pipe 35 passes through the several parts thereof to the lower opening 22 therein. From there, the vapor and condensed liquid pass into the next section at the high side thereof and successively through the alternately inclined sections and out through the pipe 36, a cooling agent, such as cold water being applied to the outside surfaces of the several sections.

The condenser above described provides a large amount of condensing surface per volume, and by reason of the inclination of the several sections the flow of fluid therethrough is continuous and unimpeded. Wax oils and heavy distillates will not clog the same and the drainage is perfect.

The several sections, furthermore, are sufficiently spaced to permit access between the same for repairs, and to permit the removal of accumulated mud and scale, either with a high pressure hose or with a scraping tool.

The several sections being of a unitary and separate character the same can be readily and conveniently removed for repairs and replaced, it being necessary only to disconnect a single pair of bolts between each pair of successive adjacent sections. The several pairs of bolts being arranged alternately at diagonally opposite portions of the assembled stack of sections and outwardly spaced therefrom may be conveniently removed and when connected are sufficient to rigidly hold the sections assembled and to form tight joints between the members 20, 21.

The condenser embodying my said invention is especially valuable in oil refineries, and in chemical reduction and by-product plants for thoroughly condensing and cooling low pressure vapors.

I claim:

1. An integrally cast condenser element comprising a hollow body portion, a pair of hub members projecting from the opposite sides thereof; one of said hub members being disposed at each end of said body portion, and a lug at each of said ends projecting from the side thereof opposite the adjacent hub member thereon, and having a length greater than that of a hub member; the hub member and the lug upon each side of said element being adapted to register with a corresponding hub member and lug respectively of another similar member to permit of the assembly of said elements with the same in inclined and spaced relation to each other, substantially as specified.

2. An integrally cast condenser element comprising a hollow body portion, a pair of annular members projecting from the opposite sides thereof; one of said annular members being disposed at each end of said body portion, and an arc-like lug disposed at each of said ends, projecting from the side thereof opposite the adjacent annular member therein, and having a curvature corresponding with that of said adjacent annular member; the annular member and the lug upon each side of said element being adapted to register with a corresponding annular member and lug, respectively, of another similar element to be disposed in juxtaposition thereto, substantially as specified.

3. An integrally cast condenser element comprising a plurality of interconnected communicating parts, hub members projecting from the opposite sides of said element at the ends of said parts, and a lug at each of said ends projecting from the side thereof opposite the adjacent hub member thereon; the hub members and lugs upon opposite sides of said element being adapted to register with the corresponding hub members and lugs respectively of similar elements to be disposed at opposite sides of said first named element, substantially as specified.

4. A condenser element comprising a plurality of interconnected communicating parts having the ends thereof disposed at diagonally opposite corners of said element, a pair of hub members projecting from the opposite sides of said element; one of said hub members being disposed at each of said ends, and a lug at each of said ends projecting from the side thereof opposite the adjacent hub member thereon; said hub members and said lugs being adapted to register with the corresponding hub members and lugs respectively of similar elements to be disposed at opposite sides of said first named element, substantially as specified.

5. An integrally cast condenser element comprising a hollow body portion, a pair of annular members projecting from the opposite sides thereof; one of said annular members being disposed at each end of said body portion, and an arc-like lug at each of said ends projecting from the side thereof opposite the adjacent annular member and having a curvature substantially equal to that of said adjacent annular member; said lugs each having a length greater than that of an annular member; and the annular member and the lug at each side of said element being recessed at the edges thereof to permit of the same interengaging the corresponding annular member and lug, respectively, of another similar element adapted to be disposed in juxtaposition thereto, substantially as specified.

6. An integrally cast condenser element comprising a plurality of intercommunicating parts having the ends thereof disposed at diagonally opposite corners of said element, a pair of annular members projecting from the opposite sides of said element; one of said annular members being disposed at each of said ends, an arc-like lug at each of said ends projecting from the side thereof opposite the adjacent annular member thereon and having a curvature corresponding with that of an annular member; said lugs each having a length greater than that of an annular member, and lugs of unequal length projecting from the opposite sides of each of the remaining diagonally opposite corners of said element; each of said lugs and each of said annular members being adapted to register with a corresponding lug and annular member, respectively, of similar elements to be disposed at opposite sides of said first named element, whereby to provide an assembly in which the elements are maintained in inclined and spaced relation to each other, and in which said elements are communicatively connected alternately at diagonally opposite portions thereof, substantially as specified.

7. A plurality of integrally cast condenser elements disposed in juxtaposition and each comprising a plurality of intercommunicating parts having the ends thereof disposed at diagonally opposite corners of the element, a pair of annular members projecting from the opposite sides of the element; one of said annular members being disposed at each of said ends, an arc-like lug disposed at each of said ends, and projecting from the side thereof opposite the adjacent annular member thereon, and having a curvature corresponding with that of an annular member; said arc-like lugs each having a length greater than that of an annular member, and lugs of unequal length projecting from the opposite sides of each of the remaining diagonally opposite corners of the element; the opposing lugs and annular members of adjacent elements registering with each other to maintain the elements in inclined and spaced relation; and the engaging edges of certain of said lugs and said annular members interfitting to maintain said elements against lateral displacement, and means for connecting said elements together adjacent to each pair of said engaging annular members, whereby to secure said elements together alternately at diagonally opposite corners thereof, substantially as specified.

Signed at the city of Buffalo, in the county of Erie, State of New York, this 5th day of December, one thousand nine hundred and twenty-three.

ARCHER A. LANDON.